United States Patent [19]

Drees et al.

[11] 4,022,546
[45] May 10, 1977

[54] HELICOPTER ROTOR BLADE

[75] Inventors: Jan M. Drees, Dallas; Arthur D. Gravley, Euless; Charles V. Palachek, Smithfield; James L. Spencer, Arlington, all of Tex.

[73] Assignee: Textron, Inc., Providence, R.I.

[22] Filed: Nov. 6, 1975

[21] Appl. No.: 629,577

Related U.S. Application Data

[63] Continuation of Ser. No. 430,344, Jan. 3, 1974, abandoned.

[52] U.S. Cl. .................. 416/226; 416/233
[51] Int. Cl.² .................. B64C 27/46
[58] Field of Search ...... 416/226, 233, 230, 241 A, 416/229, 234

[56] References Cited

UNITED STATES PATENTS

| | | | |
|---|---|---|---|
| 2,674,327 | 4/1954 | Pullin et al. | 416/226 |
| 2,694,458 | 11/1954 | Stevens | 416/226 |
| 2,734,586 | 2/1956 | Wright et al. | 416/234 X |
| 2,884,078 | 4/1959 | Stamm et al. | 416/226 |
| 3,155,166 | 11/1964 | Stulen et al. | 416/226 |
| 3,333,642 | 8/1967 | Kee | 416/226 |
| 3,484,174 | 12/1969 | McCoubrey | 416/132 |
| 3,528,753 | 9/1970 | Dutton et al. | 416/226 |
| 3,552,881 | 1/1971 | Rogers et al. | 416/226 X |
| 3,713,751 | 1/1973 | Fradenburgh et al. | 416/226 X |
| 3,813,186 | 5/1974 | Palachek et al. | 416/226 |

Primary Examiner—Everette A. Powell, Jr.
Attorney, Agent, or Firm—Richards, Harris & Medlock

[57] ABSTRACT

A helicopter main rotor has blades with an inboard airfoil having a high lift-drag ratio for efficient hovering and a "shock-free" outboard airfoil for high speed cruise. Each rotor blade has a structural section composed of metal spars and metal skins forming torque boxes accompanied by a nonstructural fairing and after body. Secured within the torque boxes and the after body are honeycomb cellular structures of a metallic and nonmetallic material, depending on the area wherein the cellular structure is secured. At a point along the blade radius, between 60% and 75%, the upper metal skin of the aft torque box changes from an outer contour surface of the blade to a flat surface parallel to and above the cord line. A fairing of fiberglass skin is secured over a nonmetallic cellular structure over the flat surface of the upper metal skin to complete the upper outer airfoil contour outboard of the 75% radius dimension. The lower outer airfoil contour is the metal skin of the aft torque box followed by a fiberglass skin joined at a trailing edge with the fiberglass upper surface.

20 Claims, 9 Drawing Figures

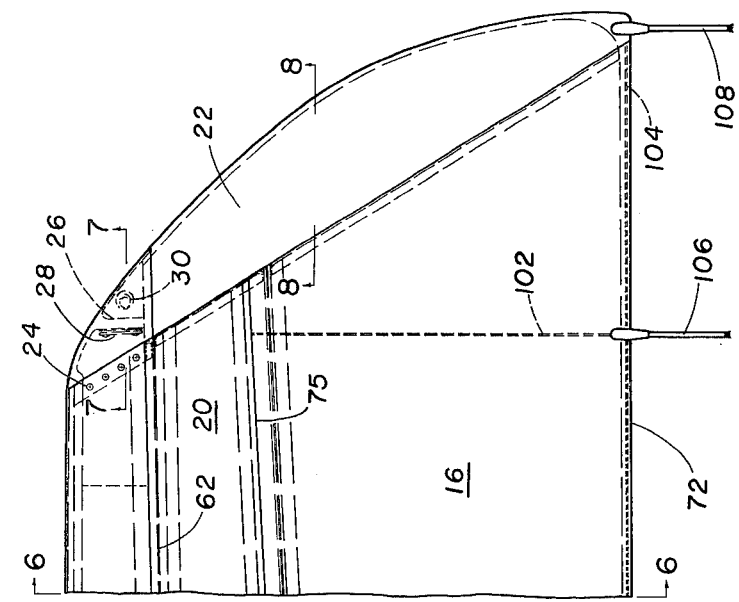
FIG. 2
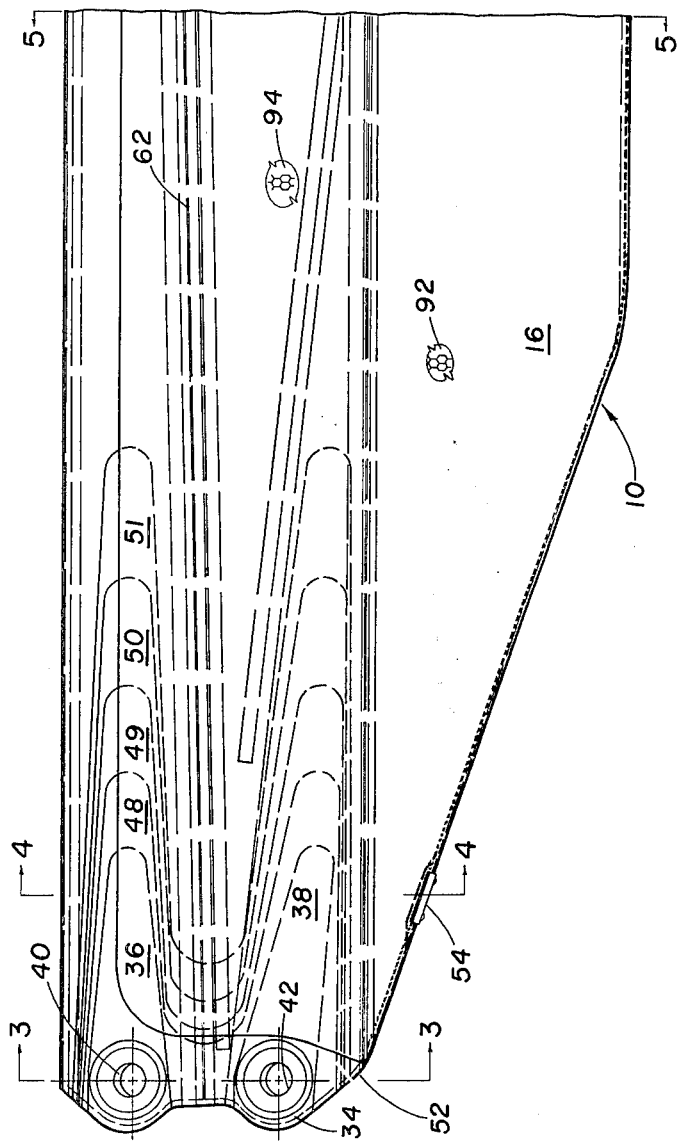
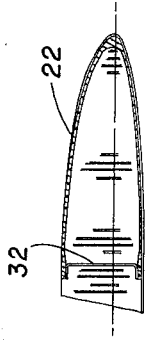
FIG. 8
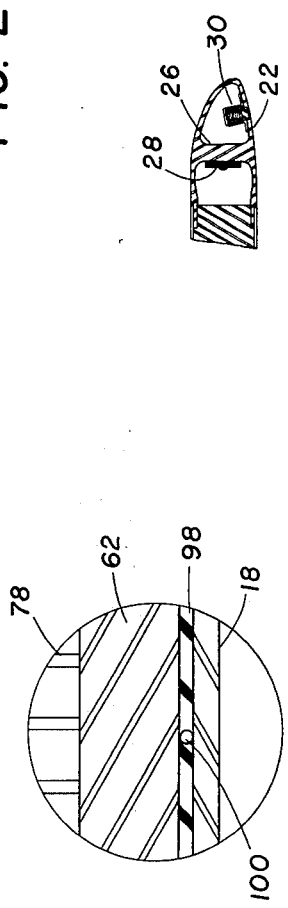
FIG. 7
FIG. 9

HELICOPTER ROTOR BLADE

This is a continuation of application Ser. No. 430,344, filed Jan. 3, 1974, now abandoned.

This invention relates to an airfoil, and more particularly to a helicopter rotor blade for optimum hovering, maneuverability and high speed performance simultaneously.

In the early 1950's efforts were begun to develop an airfoil having a high-lift forward chambered profile. Such a profile was eventually developed and used in production blades. In the mid 60's, a thin chambered blade section was developed and this blade was also used on production models of main rotor blades and tail rotor blades. In the late 60's, a blade operating in the transonic speed range was developed utilizing the well-known "peaky" approach. These extensive efforts to develop improved airfoils were prompted in part by activity in helicopter development to increase the forward flight speed. Further, as new uses for helicopters developed increased maneuverability was a prerequisite. This increased maneuverability produced particularly severe stress and force profiles over a rotor blade length.

To meet the demands on the rotor blades for this new generation of high speed helicopters with greater maneuverability, many attempts have been made to provide a rotor blade with the necessary surface area and the required mechanical stress characterisitics. Main rotor blades for helicopters have, heretofore, been made with a nose spar or leading edge spar constructed of a U-shaped channel of light weight material but having high impact resistance. Stainless steel sheets in the form of the U-shaped channel provided a suitable material for the leading edge spar. The trailing edge of the nose spar has been supported by a rigid shear strip closure member to provide shear resistance. An upper and lower skin, suitably shaped to the appropriate airfoil design, is attached at the leading edge thereof to the trailing edge of the nose spar. This skin terminates in a sharp trailing edge seam. The interior of the skin covered portion of the blade is filled with a honeycomb fillerlike cellular structure in impart the necessary stiffness thereto.

A feature of the present invention is to provide a rotor blade having a high lift-drag ratio with high drag-rise mach numbers and improved maximum lift characteristics. A further feature of the present invention is to provide a rotor blade that simultaneously provides for efficient hovering, low compressability losses in high speed level flight, and high-G maneuverability.

In accordance with the present invention, there is provided a rotor blade having a thickness greater than that of a structural member over a substantial portion of the blade length. This thickness greater than the structural member extends from near the blade root to a point near the blade tip. The blade comprises a structural member coupled to a mast pylon and extends radially therefrom. Encompassing the structural member and connected thereto is a nonstructural airfoil to establish the desired blade contour while minimizing stiffness of the composite blade.

In accordance with a more specific embodiment of the present invention, a rotor blade is provided that includes a nose spar extending lengthwise of the blade along the leading edge thereof and open to the rear at upper and lower trailing edges. Mating with the upper and lower trailing edges of the nose spar is a spar closure forming a structural torque box. Located on a lengthwise axis of the blade and positioned from the spar closure on the side opposite the nose spar is an aft spar that has the trailing edge of a lower forward body skin secured thereto. A leading edge of this lower forward body skin is secured to the nose spar at the lower trailing edge thereof. Upper and lower after body skins are secured at their leading edges to the nose spar and the aft spar, respectively, and are coupled together along the trailing edge to terminate the blade in a sharp trailing edge seam. Secured to the upper leading edge of the nose spar is an upper forward body skin that is secured at the trailing edge to the aft spar between the upper after body skin and the lower forward body skin to a transition point along the blade length and then forms the forward upper contour of the airfoil. This upper forward body skin forms an aft torque box with the spar closure.

A more complete understanding of the invention and its advantages will be apparent from the specification and claims and from the accompanying drawings illustrative of the invention.

Referring to the drawing:

FIG. 2 is an enlarged view of a helicopter blade, partially cut away, illustrating construction detail of a blade in accordance with the present invention;

FIG. 7 is a section of a rotor blade, partially cut away, taken along the line 7—7 of FIG. 2 illustrating balance weights and a tie-down receptacle in the blade outboard tip;

FIG. 8 is a section of a rotor blade tip, partially cut away, taken along the line 8—8 of FIG. 2; and FIG. 9 is an exploded view of the skin and doubler construction at the section taken along the line 9—9 of FIG. 4.

Figure 1:
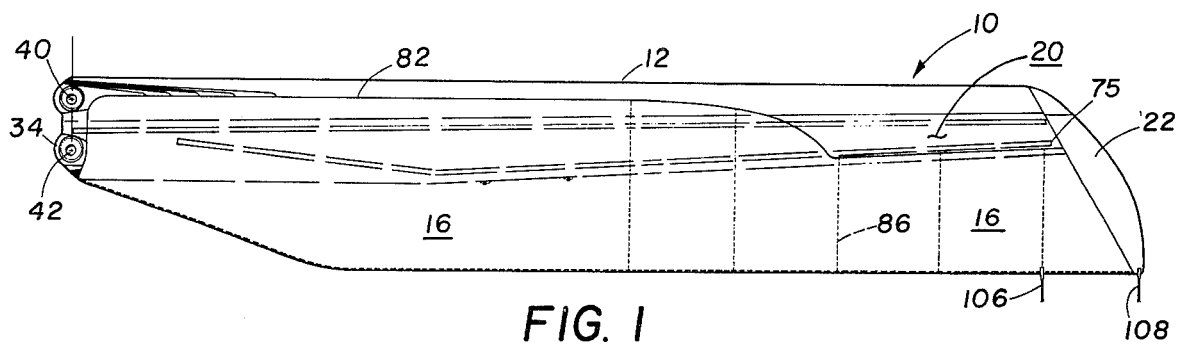
FIG. 1 is a plan view of a rotor blade for coupling to the blade grip of a rotating mast.
Figure 3:
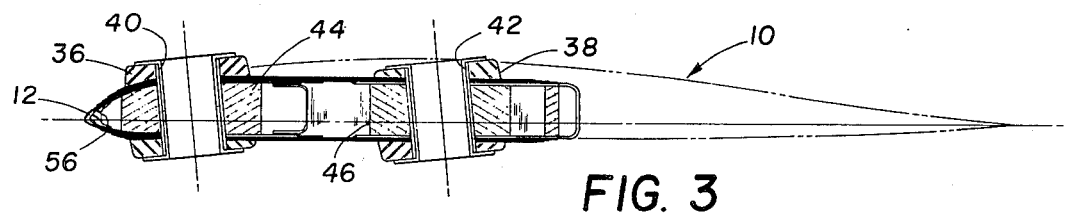
FIG. 3 is a section of the rotor blade of FIG. 2 taken along the line 3—3.
Figure 4:
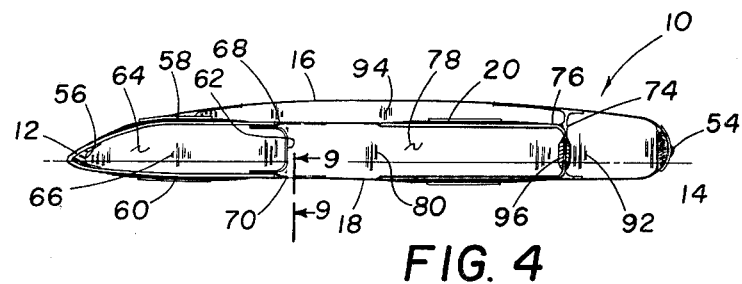
FIG. 4 is a section of the rotor blade of FIG. 2 taken along the line 4—4.

Referring to the FIGURES, there is shown a rotor blade 10 having a nose spar or leading edge spar 12 and upper and lower skin surfaces including after body skin surfaces 14 and 16 and forward body skin sections 18 and 20. An outboard end tip casting 22 is secured to the leading edge spar 12 and the skin sections 14, 18 and 20. Typically, the leading edge spar 12 may be secured to the outboard end tip 22 by means of machine screws 24.

As illustrated in FIG. 7, the outboard end tip 22 is a hollow casting that includes a bracket 26 for carrying static span balance weights 28. These span balance weights 28 are in the form of thin shims and the number required is adjustable for individual rotor blade balancing. Also included within the outboard end tip 22 is a tie-down receptacle 30 for securing the blade to the fuselage when folded or a ground anchor.

As best illustrated in FIG. 8, the end casting tip 22 is in the form of a U-shaped casting having upper and lower edges with a closure spar 32 extending the length of the casting.

At the inboard end of the rotor blade 10 there is an inboard coupler 34 for attachment to the blade grip of a rotating mast in accordance with conventional helicopter design. The inboard coupler includes grip plates 36 and 38 positioned toward the leading and trailing edges, respectively, of the blade. Extending through the grip plates 36 and 38 are bushings 40 and 42, respectively, for receiving fasteners to couple to the blade grip. Rigidity is imparted to the inboard coupler by means of phenolic fillers 44 and 46 for each of the bushings 40 and 42.

Extending along the longitudinal axis of the blade 10 from the grip plates 36 and 38 are doublers 48-51. Each of these doublers is basically a V-shaped member extending the width of the structural portion of the blade. In accordance with a feature of the present invention, the doublers 48-51 are secured to the forward body skin 20 below the surface of the after body skin 16, thereby enabling a smoother air flow pattern over the airfoil.

A root closure 52 is positioned between the upper and lower skin surfaces at the inboard end of the blade to enclose the tapering chamber formed by the surfaces. Attached to the root closure 52 are static cord balance weights 54 of a thin lamination material. The number of such weights required is adjustable for individual rotor blade balancing.

Figure 5:
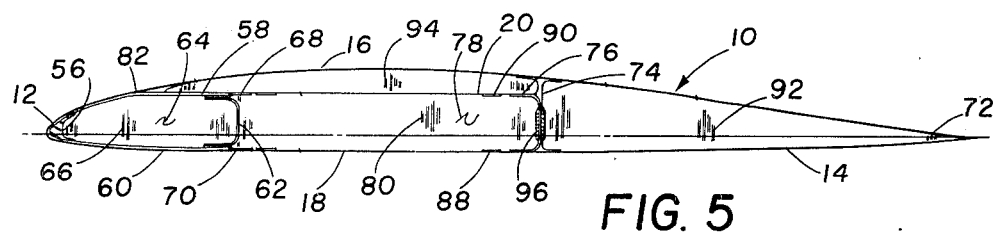
FIG. 5 is a section of the rotor blade of FIG. 2 showing the blade's construction from the blade root up to a point about 60% of the blade length.
Figure 6:
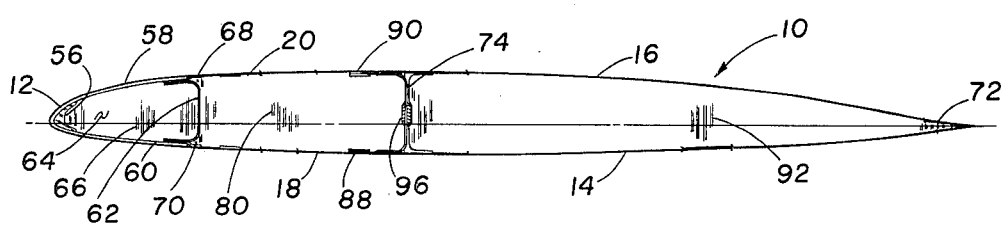
FIG. 6 is a section through the blade of FIG. 2 showing construction details from a point about 75% of the blade length to the outboard end of the blade outboard tip.

With particular reference to FIGS. 5 and 6, the leading edge spar 12 has a generally U-shaped configuration and includes a nose block 56 with an upper rearward directed surface 58 and a lower rearward directed surface 60. Secured to the trailing edge of the upper surface 58 is the upper forward body skin 20 and secured to the trailing edge of the lower surface 60 is the lower forward body skin 18.

Between the trailing edges of the nose spar 12 there is secured a spar closure 62 extending the length of the blade from the root to the blade tip end 22. This spar closure along with the nose spar 12 forms a forward torque box 64 as part of the structural framework of the blade. Mounted within the torque box 64 is a light weight, metallic, high impact resistant, honeycomb cellular structure 66. In addition to adding rigidity to the leading edge of the blade, this cellular structure also tends to localize damage caused by an exploding projectile.

To further add rigidity to the forward torque box section of the blade 10, an upper spar doubler 68 and a lower spar doubler 70 are mounted at the trailing edge of the leading edge spar 12 and extend the length of the blade. These spar doublers are in addition to the doublers 48-51 associated with the grip plates 36 and 38.

Positioned from the spar closure 62 toward the trailing edge 72 there is an aft spar 74 extending substantially parallel with the spar closure lengthwise of the blade from the root to the blade tip end 22. Basically, the aft spar 74 has an I-beam shaped configuration with upper and lower leading edges and upper and lower trailing edges. However, from the blade root to the FIG. 6 section line, a point about 60% of the blade length, the aft spar 74 includes a third leading edge 76, as best illustrated in FIG. 5. This leading edge 76 gradually merges with the upper leading edge of the spar 74 until at the section of FIG. 6 only the upper leading edge remains.

Attached to this leading edge 76 is the trailing edge of the upper forward body skin 20. The trailing edge of the skin 20 follows the edge 76 until at the section of FIG. 6, and to the blade tip, it is secured to the upper leading edge of the spar 74. Secured to the upper trailing edge of the spar 74 from the FIG. 6 section line to the blade end tip 22 is the after body skin 16. The lower leading edge of the spar 74 is secured to the trailing edge of the lower forward body skin 18 and the lower trailing edge is secured to the leading edge of the lower after body skin 14. As illustrated, the trailing edges of the after body skins 14 and 16 terminate at a trailing edge strip 72.

The spar members 62 and 74 along with the lower and upper forward body skins 18 and 20 form an aft torque box 78 that in conjunction with the torque box 64 comprises the structural framework of the blade. Assembled within the aft torque box 78 is a light weight, metallic, high impact resistant honeycomb cellular structure 80 similar to the structure 66. Note, that the cellular structure 80 extends to the blade tip end 22.

With reference to FIG. 5, the trailing edge of the nose spar 12 includes an intermediate trailing edge along a line 82 for securing to the leading edge of the after body skin 16 before the section line of FIG. 6. That is, from the blade root up to the FIG. 6 section line, about 60 to 75% of the blade radius, the upper forward body skin 20 is secured to the trailing edge of the spar 12 at the spar closure 62. Over this length of the blade 10, the upper after body skin 16 extends forward of the leading edge of the skin 20 and is secured to the spar 12 along the line 82.

In the transition between the blade structure as shown in FIG. 5 and that as shown in FIG. 6, that is, in the section 86 of FIG. 1, the line 82 blends into the trailing edge of the nose spar 12 and the leading edge of the upper after body skin 16 follows this line. From the section line of FIG. 6, the upper after body skin 16 is secured to the trailing edge of the aft spar 74 along the line 75. Mounted to the inside of the structural skins are unidirectional fiberglass crack arrestors 88 and 90 that extend along a longitudinal axis of the blade. As best illustrated in FIG. 1, these crack arrestors extend substantially the length of the blade from the outboard end tip 22 to the inboard coupler.

To provide the required stiffness and mechanical strength to the blade 10 to withstand the shock effects of high speed flights and enable the manufacture of extended lengths of cord measurement blade, the internal area between the skins 14 and 16 aft of the spar 76 is filled with a light weight, nonmetallic, high impact resistant, honeycomb cellular structure 92. This nonmetallic honeycomb structure along with the after body skins 14 and 16 are part of the nonstructural after body of the blade. That is, this section of the blade does not provide supporting framework for the overall blade assembly.

Assembled within the volume formed by the upper after body skin 16 and the upper forward body skin 20 is a light weight, nonmetallic, high impact resistant, honeycomb cellular structure 94 similar to the structure 92. This honeycomb structure extends from the blade root to the point of merger of the leading edge 76 with the upper leading edge of the aft spar 76. This is also part of the nonstructural framework of the airfoil.

Extending the length of the blade is an aft stiffener 96 secured to the aft spar 74. Typically, this stiffener is of a metallic material 1/8 inch thick and 1/4 inch wide.

With reference to FIG. 9, all the skin sections 14, 16, 18 and 20 are secured to their respective spar members by means of adhesive bonding in a full cavity tool, in which the blades are molded to the shape desired. The section of FIG. 9 shows the lower forward body skin 18 with an adhesive layer 98 securing it to the spar doubler 62 and the honeycomb structure 78, all bonded by means of the adhesive with the honeycomb crushed to shape during the bonding operation.

Also shown in FIG. 9, in adhesive layer 98, is a lightning protection wire 100 which is one of several extending through the blades. This wire is coupled through the blade grip to the helicoper fuselage. Lightning diverter strips 102 and 104, see FIG. 2, are also provided, with the diverter strip 104 extending the length of the blade. Attached to the trailing edge of the blade, toward the outboard end thereof, are electrostatic discharge elements 106 and 108.

In one model of the blade as constructed, the blade end tip 22 comprises a nickel plated fiberglass material molded into a desired shape. The after body skins 14 and 16 are also fiberglass as is the trailing edge strip 72. The honeycomb structures 92 and 94 are of a fiberglass material and are available from the Hexell Corporation, Coast Manufacturing Division. The nose spar 12 along with the spars 62 and 74 and the lower and upper forward body skins 18 and 20 are of a corrosion resistant aluminum alloy and provide high impact resistance. The honeycomb structures 66 and 80 are also of a corrosion resistant aluminum alloy.

Although described with reference to a helicopter blade, it should be understood that the invention is applicable to other airfoils. Thus, while only one embodiment of the invention, together with modifications thereof, has been described in detail herein and shown in the accompanying drawings, it will be evident that various further modifications are possible without departing from the scope of the invention.

What is claimed is:

1. An airfoil, which comprises in combination:
    a nose spar extending lengthwise of the airfoil at the leading edge thereof and having upper and lower trailing edges,
    an aft spar located on a lengthwise axis of the airfoil positioned from said nose spar,
    an upper after body skin secured at the leading edge to the upper trailing edge of said nose spar from the airfoil root to a transition point and thereafter to said aft spar,
    a lower after body skin secured at a leading edge to said aft spar and coupled at a trailing edge thereof to the trailing edge of the upper after body skin,
    a lower forward body skin secured at a leading edge to the lower trailing edge of said nose spar and at a trailing edge to said aft spar at the leading edge of said after body skin, and
    between the upper after body skin and the lower forward body skin from the airfoil root to the transition point, an upper forward body skin secured at a leading edge to said nose spar and at a trailing edge to said aft spar to form a torque box therewith, from the transition point to the airfoil tip the upper forward body skin is secured at a leading edge to the upper trailing edge of said nose spar and at a trailing edge to said aft spar at the leading edge of the upper after body skin.

2. An airfoil as set forth in claim 1 wherein said nose spar includes an upper after body skin trailing edge and an upper forward body skin trailing edge, the upper after body skin secured to the former and the upper forward body skin secured to the latter.

3. An airfoil as set forth in claim 1 including an aft spar stiffener secured to and extending lengthwise of said aft spar.

4. An airfoil as set forth in claim 1 including a first honeycomb cellular structure within said torque box, a second honeycomb cellular structure between the upper and lower after body skins and said aft spar, and a third honeycomb cellular structure secured between said upper after body skin and said upper forward body skin.

5. An airfoil as set forth in claim 4 wherein said first honeycomb cellular structure is of a metallic material and said second and third honeycomb structures are of a nonmetallic material.

6. A helicopter rotor blade, which comprises:
    a U-shaped leading edge spar extending lengthwise of the blade at the leading edge thereof and open to the rear at upper and lower trailing edges,
    a channel-shaped spar closure having upper and lower leading edges fitting between the upper and lower trailing edges of said leading edge spar to form a forward torque box therewith,
    an I-shaped aft spar having upper and lower leading and trailing edges located on a lengthwise axis of the blade positioned from said spar closure opposite the leading edge spar,
    an upper after body skin secured at the leading edge to the upper trailing edge of said nose spar from the blade root to the transition point and thereafter to the upper trailing edge of said aft spar,
    a lower after body skin secured at the leading edge to the lower trailing edge of said aft spar and coupled at a trailing edge thereof to the trailing edge of the upper after body skin,
    a lower forward body skin secured at a leading edge to the lower trailing edge of said nose spar and at a trailing edge to said aft spar, and
    between the upper after body skin and the lower forward body skin from the blade root to the transition point, an upper forward body skin secured at a leading edge to said nose spar and at a trailing edge to the upper leading edge of said aft spar, to form an aft torque box with said spar closure, and from the transition point to the blade tip the upper forward body skin is secured at a leading edge to the upper trailing edge of said nose spar and at a trailing edge to the upper leading edge of said aft spar at the leading edge of the upper after body skin.

7. A helicopter rotor blade as set forth in claim 6 including a spar doubler at the intersection of the upper trailing edge of said leading edge spar and said spar closure and at the intersection of the lower trailing edge of said leading edge spar and said spar closure.

8. A helicopter rotor blade as set forth in claim 6 including a first metallic honeycomb cellular structure within the forward torque box, a second metallic honeycomb cellular structure within the aft torque box, a first nonmetallic honeycomb cellular structure between the upper and lower after body skins and said aft spar, and a second nonmetallic cellular structure between the upper after body skin and the upper forward body skin between said spar closure and said aft spar.

9. A helicopter rotor blade, which comprises: a nose spar extending lengthwise of the blade at the leading edge thereof and opened to the rear at an upper after body skin trailing edge, an upper forward body skin trailing edge from the blade root to a transition point, and a lower trailing edge,
- a spar closure having an upper and lower leading edge fitting within the trailing edges of said nose spar to form a forward torque box therewith,
- an aft spar having upper and lower leading and trailing edges located on a lengthwise axis of the blade positioned from said spar closure opposite the nose spar,
- an upper after body skin secured at the leading edge to the upper after body skin traling edge of said nose spar from the blade root to the transition point and thereafter to the upper trailing dge of said aft spar,
- a lower after body skin secured at a leading edge to the lower trailing edge of said aft spar and coupled at the trailing edge thereof to the trailing edge of the upper after body skin,
- a lower forward body skin secured at a leading edge to the lower trailing edge of said nose spar and at a trailing edge to the lower leading edge of said aft spar at the leading edge of said lower after body skin, and
- between the upper after body skin and the lower forward body skin from the blade root to the transition point, an upper forward body skin secured at a leading edge to the upper forward body skin trailing edge of said nose spar and at a trailing edge to said aft spar to form an aft torque box with said spar closure, and from the transition point to the blade tip the upper forward body skin is secured at a leading edge to the upper after body skin trailing edge of said nose spar and at a trailing edge to the upper leading edge of said aft spar at the leading edge of the upper after body skin.

10. A helicopter rotor blade as set forth in claim 9 including a first honeycomb cellular structure within the forward torque box, a second honeycomb cellular structure within the aft torque box, a third honeycomb structure between the upper and lower after body skins and said aft spar, and a fourth honeycomb cellular structure between the upper after body skin and the upper forward body skin between said spar enclosure and said aft spar.

11. A helicopter rotor blade as set forth in claim 9 wherein said upper and lower after body skins are nonstructural fiberglass.

12. A helicopter rotor blade as set forth in claim 11 wherein said upper and lower forward body skins are structural members of the aft torque box.

13. A helicopter rotor blade as set forth in claim 9 including an aft spar stiffener secured to and extending lengthwise of said aft spar.

14. A helicopter rotor blade as set forth in claim 13 including a spar doubler at the intersection of the upper trailing edge of said nose spar and said spar closure and at the intersection of the lower trailing edge of said nose spar and said spar closure.

15. A helicopter blade for a rotor assembly including a pylon rotating with a supporting mast, comprising in combination:
- a first structural member including a first torque box extending from a root point to an outboard end tip,
- a second structural member including a second torque box extending from the root point to the outboard tip and joined to the first torque box,
- means for joining said first and second structural members to the rotating pylon, and
- nonstructural airfoil members connected to said first and second structural members and partially encompassing said second structural member from a root point to a transition point and thereafter connected only to the second structual member to define an airfoil contour.

16. A helicopter blade as set forth in claim 15 including a first honeycomb cellular structure included within the first and second structural members, and a second honeycomb cellular structure included between the nonstructural airfoil members and the second structural member to further define the airfoil contour.

17. A helicopter blade as set forth in claim 15 wherein said first structural member includes a nose spar extending lengthwise of the blade at the leading edge thereof.

18. A helicopter blade as set forth in claim 17 wherein said second structural member includes an aft spar located on the lengthwise axis of the blade positioned from said nose spar.

19. A helicopter blade as set forth in claim 18 wherein one of the nonstructural airfoil members partially encompasses the structural member from the blade root to a transition point along a cord line to the blade.

20. A helicopter blade as set forth in claim 15 wherein said first torque box includes a trailing aft spar and said aft torque box includes upper and lower leading edges joined to said aft spar.

* * * * *